(12) United States Patent
Scoville et al.

(10) Patent No.: US 6,237,032 B1
(45) Date of Patent: May 22, 2001

(54) NETWORK SCAN SERVER READY STATE RECOVERY METHOD

(75) Inventors: Dean L. Scoville, Auburn; David A. Kumpf, Rocklin, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/164,137

(22) Filed: Sep. 30, 1998

(51) Int. Cl.[7] .................................................. G06F 15/177
(52) U.S. Cl. ............................................. 709/221; 709/220
(58) Field of Search ..................................... 709/221, 220, 709/203, 229, 237; 714/4, 5, 7; 710/15, 17, 18, 8, 19

(56) References Cited

U.S. PATENT DOCUMENTS

| | | | |
|---|---|---|---|
| 5,537,626 | * 7/1996 | Kraslavsky et al. ...................... 710/8 |
| 5,784,622 | * 7/1998 | Kalwitz et al. ...................... 710/200 |
| 5,933,580 | * 8/1999 | Uda et al. ............................. 358/408 |
| 6,057,930 | * 5/2000 | Blossey et al. ..................... 358/1.15 |
| 6,101,555 | * 8/2000 | Goshey et al. ....................... 709/301 |

* cited by examiner

Primary Examiner—Mehmet B. Geckil

(57) ABSTRACT

A method for preventing a hung state of a peripheral, the peripheral being connected by a protocol channel through a server to a network, and the network having a client. For certain types of peripherals, e.g. scanner control language peripherals, the present invention sends a reset sequence to the peripheral and then checks for a data flow between the client and the peripheral during a check data time period. Additionally, the invention sends an unlock sequence to the peripheral after the check for data time period expires. Thereafter, the present invention waits for an insurance time period to expire and then closes the protocol channel between the client and the peripheral. The present invention also waits for a response from the peripheral.

16 Claims, 3 Drawing Sheets

| DESCRIPTION | SCL COMMANDS | ASCII | HEX |
|---|---|---|---|
| "RESET SEQUENCE" | RESET; RESET | \<ESC\>E \<ESC\>E | 1B-45 1B-45 |
| "UNLOCK SEQUENCE" | CLEAR LOCK TIMEOUT; UNLOCK SCANNER | \<ESC\>*f0I \<ESC\>*f0H | 1B-2A-66-30-49 1B-2A-66-30-48 |

FIG. 3

NETWORK SCAN SERVER READY STATE RECOVERY METHOD

The present invention generally relates to software and firmware, i.e., software embedded on a system, and more particularly to software and firmware for restoring a network peripheral to a known state.

Modem computer peripherals can function as a fax machine, a telephone, a printer, a scanner, a copier, and/or other device. Peripheral vendors typically provide custom software that implements the features of the product. However, the custom software is typically written to communicate only with a single device over a local interface, such as a SCSI bus or a parallel port. While the local interface design may be simple, all known designs fail to address issues that occur when the peripheral is attached to a network.

A problem exists when the client's application cannot be relied upon to send reset sequences due to the client's loss of network connectivity. Loss of network connectivity can occur in several ways. For example, the client may lose a connection with the peripheral due to a time out in the application that terminates the client's connection when the user fails to send data to the peripheral for a certain period of time. Additionally, a physical connection between the client and the server may terminate due to a network cable connected between the client and the server being disconnected.

Another problem that exists with all known networked peripherals involves the ability to quickly recover from a communication error over a network, and can pose some unique circumstances. Networked scanning, for example, differs from the locally attached model since the peripheral is usually accessed by a multitude of users. Thus, a communication error caused by one user can adversely affect other users on the network. Additionally, since networked peripherals are usually centrally located away from the users, the users cannot readily discover that the peripheral is in a locked or hung state.

The hung state can occur when, for example, network conditions such as congestion cause scan connections to be dropped and scans to be aborted, without any guarantee that the scanner software has the opportunity to reset the scanner. Additionally, a hung state can occur when the client software abnormally terminates before it has reset the scanner. The scanner may suspend in the hung state if the peripheral is not properly reset before a communication channel between a server and the scanner is closed. A peripheral in a hung state requires the user to engage the peripheral to cycle power to the peripheral, i.e, turn the power off and on. If the user fails to perform a power cycle, the peripheral will remain in a hung state for that user and other users on the network.

Accordingly, it is a primary object of the present invention to provide an improved server apparatus which can prevent the peripheral from reaching the hung state when a scan job is aborted.

Another object of the present invention is to provide an improved server apparatus which can prevent the peripheral from reaching the hung state when the network connection terminates due to a time out period elapsing.

Yet another object of the present invention is to provide an improved server apparatus which can prevent the peripheral from reaching the hung state when the network connection is physically terminated.

Other objects and advantages will become apparent upon reading the following detailed description, in conjunction with the attached drawings.

SUMMARY OF THE INVENTION

The present invention is directed to an improved apparatus in the form of software and firmware for supporting a scan peripheral over the network, which is adapted to provide a reset requirement so that the peripheral will not be inoperatively suspended for users on the network. It also involves a method for preventing a hung state of a peripheral, the peripheral being connected by a protocol channel through a server to a network, and the network having a client. For certain types of peripherals, e.g., scanner control language peripherals, the present invention sends a reset sequence to the peripheral and then checks for a data flow between the client and the peripheral during a check data time period. Additionally, one embodiment of the invention sends an unlock sequence to the peripheral after the check for data time period expires. Thereafter, it waits for an insurance time period to expire and then closes the protocol channel between the client and the peripheral, and also waits for a response from the peripheral.

DESCRIPTION OF THE DRAWINGS

FIG. 3 is a table of reset and unlock sequences.

DETAILED DESCRIPTION

Broadly stated, the present invention is directed to an improved apparatus in the form of software and firmware for supporting a scan peripheral over the network. The apparatus is adapted to provide a reset requirement so that the peripheral will not be inoperatively suspended for users on the network.

Figure 1:
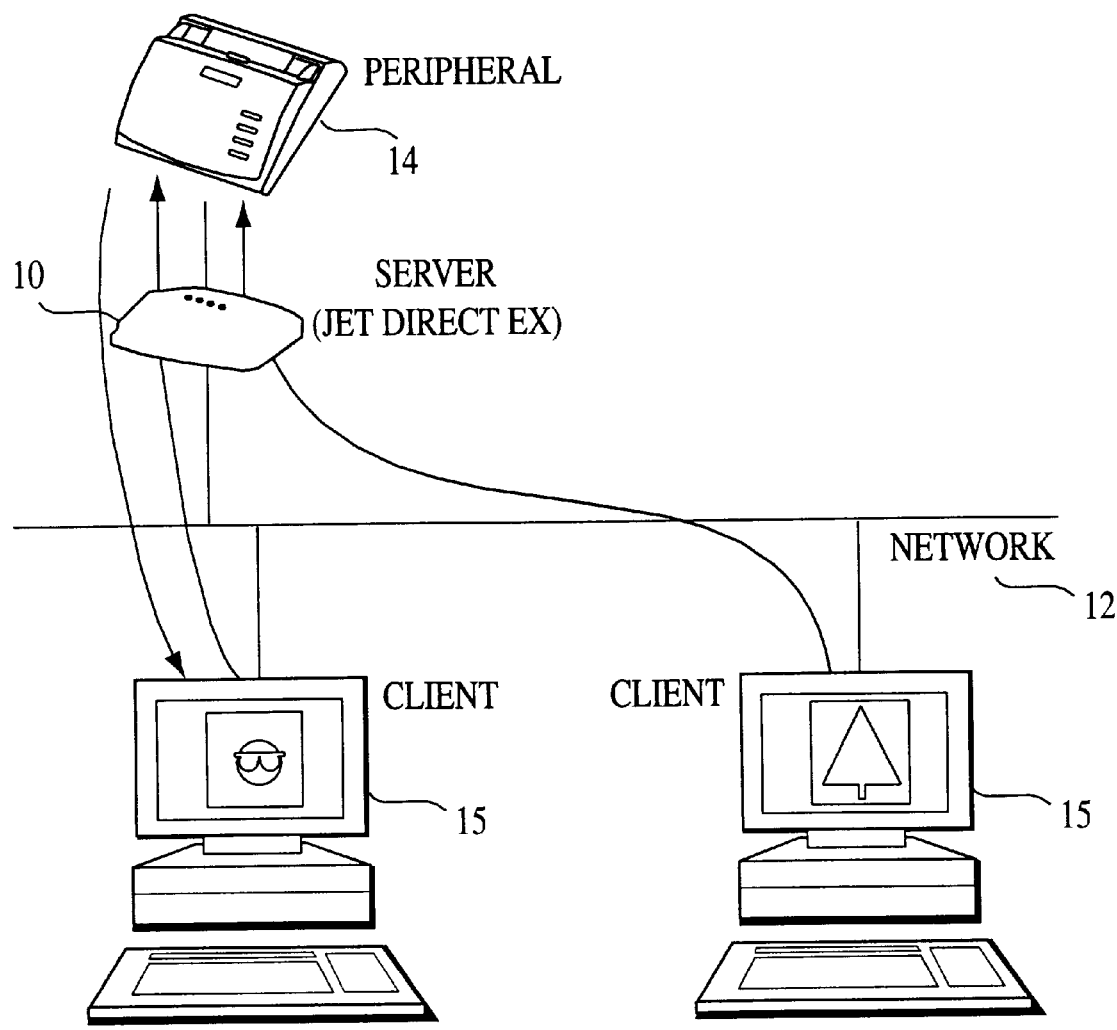
FIG. 1 is an overview of the network system.

Turning now to the drawings, and particularly FIG. 1, a server 10 of the present invention is adapted to perform steps to set a peripheral, such as a scanner, to a known state. The server 10 connects a network 12 to at least one peripheral 14. At least one client 15 establishes a connection with the peripheral 14 over the network 12. While the server 10 referred to is used as part of a Hewlett-Packard JETDIRECT EX box package, it is contemplated that the server 10 can be part of a card that connects via a bus interface to the peripheral 14, or as part of an internal central processing unit (CPU) of the peripheral 14. The JETDIRECT EX box is shown and described in a Hewlett-Packard user manual, part no. 5967-2290, and is incorporated by reference herein.

Figure 2:
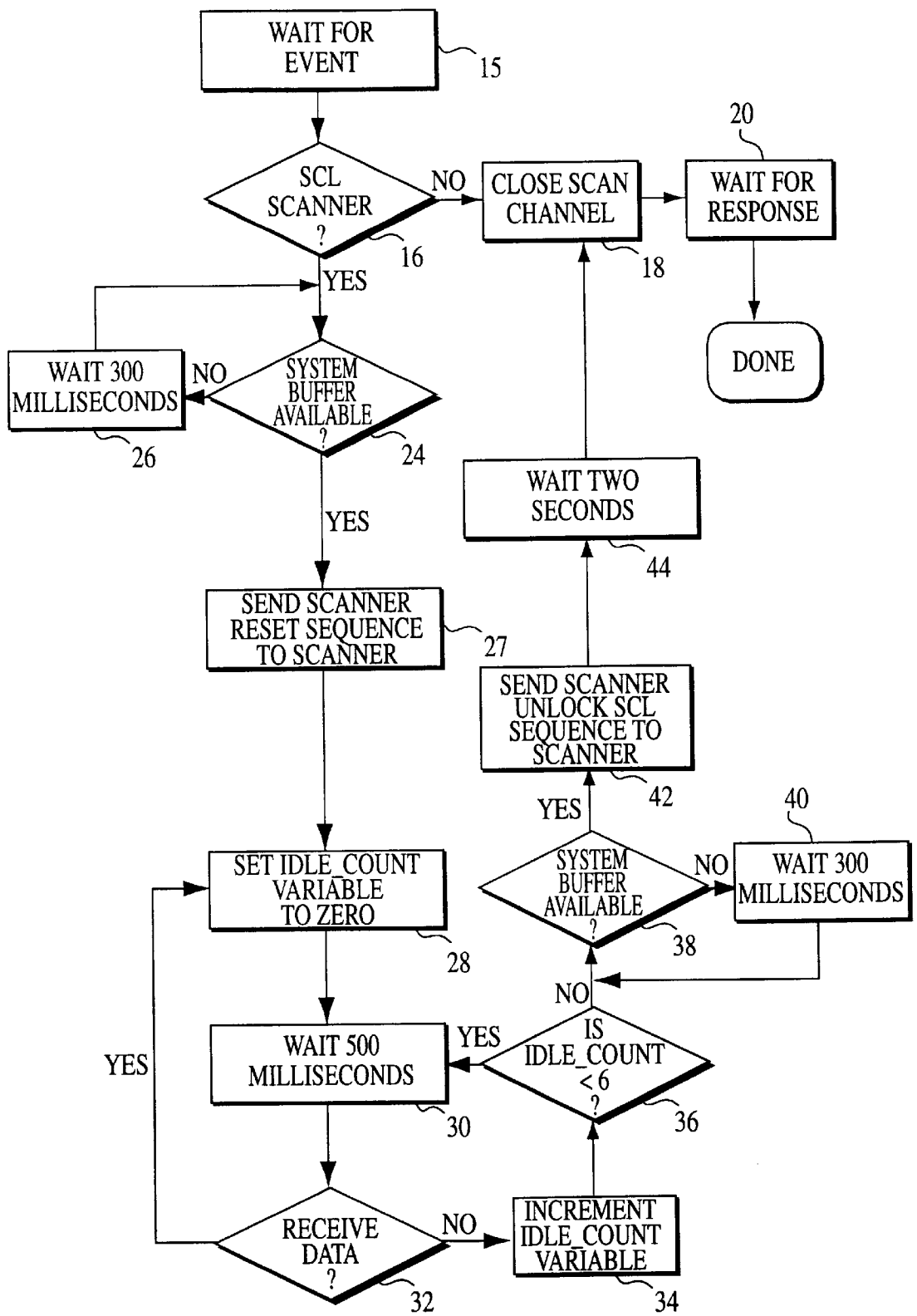
FIG. 2 is a flow chart of the present network server which can restore a scanner to a ready state.

Referring now to FIG. 2, the server 10 responds to a event (block 15). In a preferred embodiment, the event responded to is a network connection termination. Events leading to the network termination includes a network 12 communication loss, such as a disconnected cable; an expiration of a time out operation, such as when the server 10 terminates a connection after a period of no data being transferred between a client and the peripheral 14; a scan job being completed; and a connection reset, such as the client aborting a scan during a scan job. Such events normally cause the peripheral 14 to remain in an unknown state until a user cycles power to the peripheral 14 off and on.

After the network termination has occurred, the server 10 determines the scan language used by the peripheral 14, for example, a scanner control language (SCL) or a multifunction peripheral data transfer format (MFPDTF) (block 16). If the scanner functions with a MFPDTF scanner language, the server 10 can safely send a request packet to the peripheral 14 to close a channel, such as a multiple logical channels (MLC) channel, between the server 10 and the peripheral 14 (block 18). Thereafter, the server 10 waits to receive a close response from the peripheral 14 over the channel (block 20).

However, if the scanner operates with a SCL scanner language, the server 10 then checks to see if a system buffer is available on the server 10 to send data to the peripheral 14 (block 24). While the present invention refers to available system buffers, artisans will appreciate that other methods can be used to transfer data, such as direct memory access (DMA) from a fixed memory location. If a system buffer is not available, the server 10 rechecks the buffer periodically, for example, every 300 milliseconds to determine if a system buffer is available (block 26). Once a system buffer is available, the server 10 uses SCL to send a scanner "reset sequence" to the peripheral 14 (block 27). Referring to FIG. 3, the "reset sequence", at least in one language, is a combination SCL "reset; reset" which is "<ESC>E; <ESC>E" in ASCII or "1B-45; 1B-45" in hexadecimal. The "reset; reset" sequence is utilized to put the peripheral 14 in a known, i.e. reset, state. The server 10 utilizes the first "reset" to abort a scan if the peripheral 14 is in the process of scanning so that the second "reset" command can put the peripheral 14 in the known state.

Subsequently, the server 10 waits for a total of 2.5 seconds of idle time to insure that the server 10 receives any residual data that the peripheral 14 may send. To determine whether or not 2.5 seconds has passed, the server 10 sets an idle_count variable to zero (block 28). Next the server 10 waits 500 milliseconds (block 30). If the server 10 receives any data from the scanner within the half second interval, the idle_count variable is reset to zero (blocks 32 and 28). If the server 10 does not receive any data within the half second interval, the server 10 increments the idle_count variable by one (block 34). The server 10 then determines if the idle_count variable is less than six, i.e., 2.5 seconds have not elapsed (block 36). If the idle_count variable is less than six, the server 10 waits another 500 milliseconds to check whether any data has been received from the scanner (blocks 30 and 32). If the server 10 does not receive data from the scanner, the server 10 increments the idle_count variable by one (block 34).

Once the idle_count variable equals six, i.e., 2.5 seconds have elapsed, without the server 10 receiving data from the scanner, the server 10 determines whether a system buffer is available (block 38). If a buffer is not available, the server 10 periodically checks for an available buffer, for example every 300 milliseconds (block 40), to determine whether or not a system buffer is available (block 38). This process is repeated until a system buffer becomes available.

Once a system buffer becomes available, the server 10 uses SCL to send a scanner "unlock sequence" to the peripheral 14 (block 42). Referring again to FIG. 3, the "unlock sequence", at least in one language, is a combination SCL "clear lock timeout; unlock scanner" which is "<ESC>*f0I; <ESC>*f0H" in ASCII or "1B-2A-66-30-49; 1B-2A-66-30-48" in hexadecimal. If the peripheral is a multifunction peripheral (MFP), software may change a lock timeout value of the MFP to lock out a copier or a printer component of the MFP. The "clear lock timeout" command sets the lock timeout value to a known, i.e. clear, state. Subsequently, the "unlock scanner" command releases any locks that software may have initiated against the copier or the printer.

Thereafter, it has been found that it is desirable to wait two seconds, after the "unlock sequence" is performed to insure that the peripheral 14 receives and processes the sequence (block 44). After the two seconds has elapsed, the server 10 can safely send the close channel request packet to the peripheral 14 to close the channel between the server 10 and the peripheral 14 (block 18). The sever 10 then waits to receive a close response from the scanner over the channel (block 20).

It should be understood that the timing parameters in connection with the flow chart of FIG. 2 can vary within the spirit of the invention, and is a function of the speed of operation of the system and operating parameters of the scanner, all of which is known to those skilled in the art.

From the foregoing description, it should be understood that an improved server has been shown and described which has many desirable attributes and advantages. The present invention provides an improved server apparatus which can set a scanner to a known ready state, so that the scanner is in the known ready state when a next client connects to the scanner. Additionally, the improved server can recover from a scanner error when the network has lost connectivity with the scanner.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for a server on a network restoring a scan peripheral to a ready state, the network having at least one client, the peripheral being connected to the server by a protocol channel, the server being connected to the client by the network, said method comprising the steps of:
  responding to an event;
  sending a reset sequence to the peripheral;
  checking for a data flow between the client and the peripheral during a first predetermined time period;
  sending a unlock sequence to the peripheral after said first predetermined time period expires; and
  closing the protocol channel between the server and the peripheral upon expiration of an insurance time period.

2. The method in claim 1 wherein said send reset and unlock sequence operations further comprises the steps of:
  periodically checking the memory buffer for availability;
  sending said reset sequence to the peripheral in the event said memory buffer becomes available;
  periodically checking the memory buffer for availability after said first predetermined time period expires; and,
  sending a unlock sequence to the peripheral in the event the memory buffer becomes available.

3. The method in claim 1 wherein said event is a termination of a network connection.

4. A method as defined in claim 3 wherein said termination of said network connection comprises a disconnected cable previously connecting the peripheral to the network.

5. A method as defined in claim 3 wherein said termination of said network connection comprises a disconnection resulting from a server predetermined time period expiring.

6. A method as defined in claim 3 wherein said termination of said network connection comprises a disconnection resulting from a client aborting a scan operation being performed on the scan peripheral.

7. The method in claim 1 wherein said first predetermined time period is two and a half seconds.

8. The method in claim 1 wherein said insurance waiting period is two seconds.

9. The method in claim 1 wherein said data checking operation further comprises the steps of:
    setting said idle_count variable to an integer zero;
    resetting said idle_count variable to zero if data flow occurred between the client and the peripheral before a second predetermined time period expired;
    incrementing said idle_count variable if data flow does not occur between the client and the peripheral; and,
    expiring said check for data time period when said idle_count variable equals a stop integer.

10. A method as defined in claim 9 wherein said second predetermined time period is five hundred milliseconds.

11. The method as defined in claim 9 wherein said stop integer is six.

12. A method for a server on a network restoring a scan peripheral to a ready state, the network having at least one client, the peripheral being connected to the server by a protocol channel, the server being connected to the client by the network, said method comprising the steps of:
    responding to an event;
    determining the scanner language being used by the scan peripheral, and if the scanner language is SCL, said server thereafter:
        sending a reset sequence to the peripheral;
        checking for a data flow between the client and the peripheral during a first predetermined time period;
        sending a unlock sequence to the peripheral after said first predetermined time period expires; and,
        closing the protocol channel between the server and the peripheral upon expiration of an insurance time period.

13. The method in claim 12 wherein said send reset and unlock sequence operations further comprises the steps of:
    periodically checking the memory buffer for availability;
    sending said reset sequence to the peripheral in the event said memory buffer becomes available;
    periodically checking the memory buffer for availability after said first predetermined time period expires; and,
    sending a unlock sequence to the peripheral in the event the memory buffer becomes available.

14. The method as defined in claim 12 wherein said event is a termination of a network connection.

15. A method as defined in claim 12 wherein if said scanner language determining step determines that said scanner language is a multifunction peripheral data transfer format (MFPDTF), said server thereafter:
    sending a request packet to the peripheral to close the channel between the server and the peripheral; and,
    waiting for a close response from the peripheral.

16. A method for a server on a network restoring a scan peripheral to a ready state, the server having at least one memory buffer and the network having at least one client, the peripheral being connected to the server by a protocol channel, the server being connected to the client by the network, said method comprising the steps of:
    responding to a termination of a network connection;
    determining the scanner language being used by the scan peripheral;
    (a) said server performing the following steps when the scanner language is multifunction peripheral data transfer format (MFPDTF):
        sending a request packet to the peripheral to close the channel between the server and the peripheral;
        waiting for a close response from the peripheral;
    (b) said server performing the following steps when the scanner language is SCL:
        periodically checking the memory buffer for availability;
        sending a reset sequence to the peripheral in the event said memory buffer becomes available;
        checking for a data flow between the client and the peripheral during a first predetermined time period;
        periodically checking the memory buffer for availability after said first predetermined time period expires;
        sending a unlock sequence to the peripheral in the event the memory buffer becomes available; and,
        closing the protocol channel between the server and the peripheral upon expiration of an insurance time period.

* * * * *